United States Patent
Song

(10) Patent No.: US 10,788,961 B2
(45) Date of Patent: Sep. 29, 2020

(54) METHOD OF AUTOMATICALLY SWITCHING MODE OF WORK SCREEN OF DIGITAL CONTENT AUTHORING TOOL

(71) Applicant: STUDIO XID KOREA, INC., Seoul (KR)

(72) Inventor: Jae Won Song, Seoul (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

(21) Appl. No.: 16/553,270

(22) Filed: Aug. 28, 2019

(65) Prior Publication Data

US 2020/0117327 A1    Apr. 16, 2020

(30) Foreign Application Priority Data

Oct. 16, 2018   (KR) .................. 10-2018-0122920

(51) Int. Cl.
| | | |
|---|---|---|
| G06F 3/0484 | (2013.01) | |
| G06F 3/0482 | (2013.01) | |
| G06F 9/455 | (2018.01) | |
| G06F 9/451 | (2018.01) | |

(52) U.S. Cl.
CPC .......... G06F 3/0484 (2013.01); G06F 3/0482 (2013.01); G06F 9/451 (2018.02); G06F 9/455 (2013.01); G06F 2203/04803 (2013.01)

(58) Field of Classification Search
None
See application file for complete search history.

(56) References Cited

U.S. PATENT DOCUMENTS

| | | | | |
|---|---|---|---|---|
| 2008/0273110 A1* | 11/2008 | Joza | .................. | H04N 5/235 348/333.05 |
| 2009/0280790 A1* | 11/2009 | Ahn | .................. | H04W 12/08 455/418 |
| 2012/0157166 A1* | 6/2012 | Kim | .................. | G06F 21/6218 455/566 |
| 2014/0297003 A1* | 10/2014 | Nakao | .................. | G03G 15/502 700/40 |
| 2014/0365890 A1* | 12/2014 | Lei | .................. | G06F 3/0485 715/719 |
| 2015/0143277 A1* | 5/2015 | Yoon | .................. | G06F 3/04883 715/773 |
| 2016/0309089 A1* | 10/2016 | Hongu | .................. | H04N 5/23212 |
| 2017/0075707 A1* | 3/2017 | Ji | .................. | G06F 9/451 |

FOREIGN PATENT DOCUMENTS

KR     10-2005-0110417 A     11/2005

* cited by examiner

*Primary Examiner* — Toan H Vu
(74) *Attorney, Agent, or Firm* — Studebaker & Brackett PC

(57) ABSTRACT

Provided is a screen mode switching method performed by a digital content authoring terminal. The method include switching a mode of the work area to an edit mode without an input for switching the mode of the work area to the edit mode in response to a user input made to select a first user interface (UI) object for executing a first function, not made to switch the mode of the work area to the edit mode, and switching the mode of the work area to an execution mode without an input for switching the mode of the work area to the execution mode in response to a user input made to select a second UI object for executing a second function different from the first function, not made to switch the mode of the work area to the execution.

12 Claims, 16 Drawing Sheets

METHOD OF AUTOMATICALLY SWITCHING MODE OF WORK SCREEN OF DIGITAL CONTENT AUTHORING TOOL

CROSS-REFERENCE TO RELATED APPLICATIONS

This application claims the benefit of Korean Patent Application No. 10-2018-0122920, filed on Oct. 16, 2018, in the Korean Intellectual Property Office, the disclosure of which is incorporated herein by reference in its entirety.

BACKGROUND

1. Field

The present disclosure relates to a method of automatically switching a mode of a work screen of a digital content authoring tool, and more particularly, to a screen mode switching method in which a digital content authoring terminal automatically switches a current mode of a work area of an authoring tool for authoring digital content to an edit mode or an execution mode by determining a necessary work area according to a user's input.

2. Description of the Related Art

Digital content to be executed, such as an application of a smart device or a flash, is essentially required to be simulated in an authoring process.

However, a conventional digital content authoring tool executes digital content using an instance such as a program or a window to check responses of the digital content to a user's triggers while editing graphic user interface (GUI) components of the digital content. Accordingly, the user has to use a number of instances to alternate between editing and execution of the digital content. Therefore, it is required to provide a method by which a digital content authoring tool can efficiently edit digital content and simulate intermediate outputs in a parallel manner without changing instances.

SUMMARY

Aspects of the present disclosure provide a method of automatically switching a mode of a work area of a digital content authoring tool without a user's input for switching the mode of the work area.

Aspects of the present disclosure also provide a method of increasing a probability that a mode to which a mode of a work area is switched will match a mode desired by a user by switching the mode of the work area to the desired mode without the user's input.

Aspects of the present disclosure also provide a method of increasing intuitiveness of a mode to which a mode of a work area is automatically changed by changing a graphic user interface (GUI) of a digital content authoring tool when the mode of the work area is switched.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a screen mode switching method performed by a digital content authoring terminal, and the method comprising switching a mode of the work area to an edit mode without an input for switching the mode of the work area to the edit mode in response to a user input made to select a first user interface (UI) object for executing a first function, not made to switch the mode of the work area to the edit mode, and switching the mode of the work area to an execution mode without an input for switching the mode of the work area to the execution mode in response to a user input made to select a second UI object for executing a second function different from the first function, not made to switch the mode of the work area to the execution, wherein the edit mode is a mode for editing an object constituting the digital content, and the execution mode is a mode for simulating the digital content.

According to another aspect of the present disclosure, there is provided a screen mode switching method performed by a digital content authoring terminal which displays a digital content authoring interface, wherein the digital content authoring interface comprising a work area displaying digital content being authored, and the method comprises displaying a simulation area, which must be secured to simulate the digital content, in the work area in an execution mode for simulating the digital content and switching a mode of the work area to an edit mode without an input for switching the mode of the work area in response to a user input to an area outside the simulation area, wherein the edit mode is a mode for editing an object constituting the digital content.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
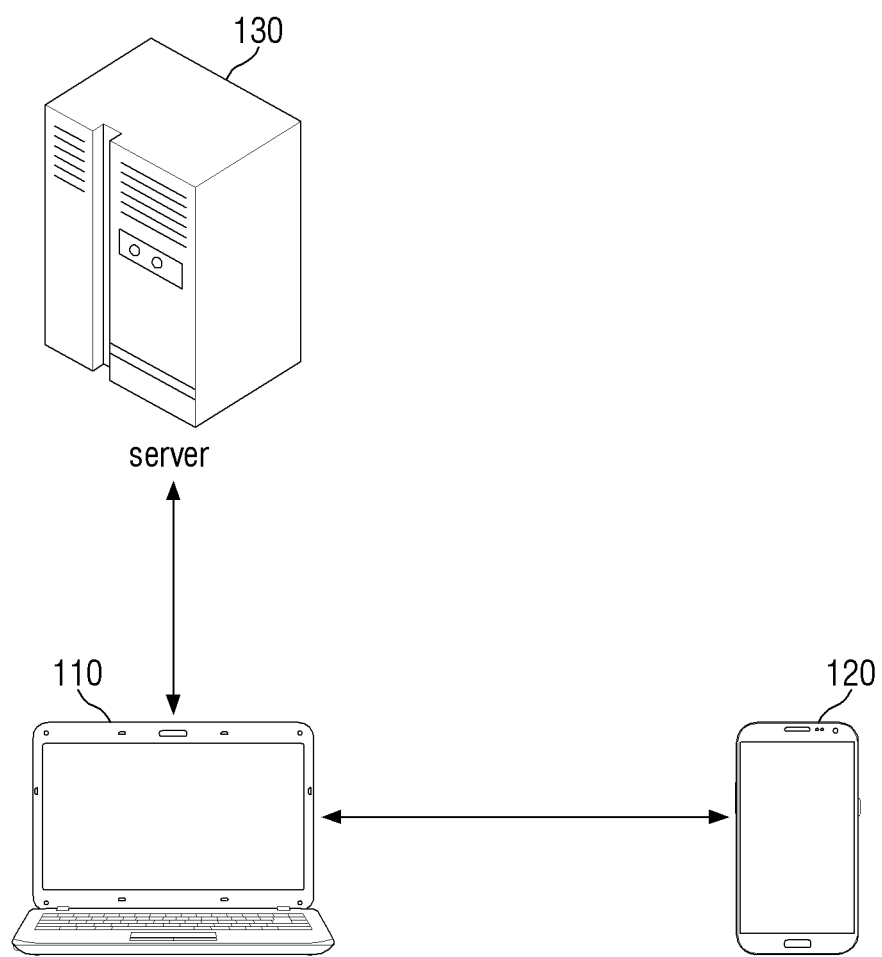
FIG. 1 illustrates the configuration of a digital content authoring system according to an embodiment.

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments of the present disclosure will be described with reference to the drawings.

Digital content, as used herein, denotes content digitally created by combining various forms of information such as text, voice, image, and video. The digital content is executed by signals of a computing device and composed of static elements and dynamic elements. The static elements and the dynamic elements will be described in detail later with reference to FIG. 3. Examples of the digital content may include applications, flashes, moving images, and prototypes.

In addition, a work area, as used herein, denotes an area where digital content produced by a digital content authoring terminal is displayed. That is, the work area is an area where objects constituting the digital content are displayed. The work area will be described in detail later with reference to FIG. 3.

In addition, a simulation area, as used herein, denotes an area that must be secured to simulate digital content and a portion that is actually displayed on a screen of a digital content execution terminal. That is, an object located outside the simulation area in the work area is an element constituting the digital content but is not displayed when the digital content is executed. The simulation area will be described in detail later with reference to FIG. 3.

In addition, a user input, as used herein, includes various forms of signals input to the digital content execution terminal or the digital content authoring terminal through an input device such as a keyboard, a mouse, or a touch screen. For example, as a user input, a user may select a user interface (UI) object displayed on a prototyping tool by using a mouse.

Hereinafter, embodiments of the present disclosure will be described in detail with reference to the attached drawings.

The configuration and operation of a digital content authoring system according to an embodiment will be described with reference to FIG. 1.

Referring to FIG. 1, the digital content authoring system according to the current embodiment includes a digital content authoring terminal 110 and a digital content execution terminal 120.

The digital content execution terminal 120 is a computing device such as a tablet computer, a smartphone, a notebook computer, or a personal computer (PC). A prototype execution terminal will be described herein as an example of the digital content execution terminal 120, and a prototype reproduction tool which is user application software is installed in the prototype execution terminal. The prototype reproduction tool is user application software that interprets a prototype and implements a user interface defined in the prototype. The digital content execution terminal 120 will also be referred to as an execution terminal.

The digital content authoring terminal 110 is a computing device such as a tablet computer, a smartphone, a PC, or a notebook computer. A prototyping terminal will be described herein as an example of the digital content authoring terminal 110, and a prototyping tool which is a user application or embedded software of the computing device is installed in the prototyping terminal. The digital content authoring terminal 110 will also be referred to as a production terminal or an authoring terminal.

A digital content authoring tool capable of executing a digital content authoring method according to an embodiment is stored in the digital content authoring terminal 110. Here, the digital content authoring tool can be considered as a kind of software and is an authoring tool that supports a user's digital content authoring activities. When a user executes the digital content authoring tool through the digital content authoring terminal 110, a digital content authoring interface (see FIG. 3) is executed, digital content is generated through certain inputs, and the generated digital content is executed on the digital content execution terminal 120. That is, it can be understood that the digital content authoring terminal 110 is a terminal for generating digital content through the digital content authoring interface and the digital content execution terminal 120 is a terminal for executing the generated digital content.

The digital content authoring terminal 110 and the digital content execution terminal 120 are computing devices that can be connected to each other through a network. A network interface is included in the digital content authoring terminal 110. Here, examples of the network include both wired and wireless networks such as a wire local area network (LAN), WiFi, Bluetooth and Zigbee will be described in detail with reference to FIG. 16. Examples of the computing devices may include all devices having network capabilities, such as desktop computers, notebook computers, smartphones, personal digital assistants (PDAs), and tablet PCs.

In addition, according to an embodiment, the digital content authoring terminal 110 may upload a generated prototype to a server 130 which may be accessed via the digital content execution terminal 120 to download a prototype. The digital content execution terminal 120 may receive the generated prototype directly from the digital content authoring terminal 110 or from the server 130.

Figure 2:
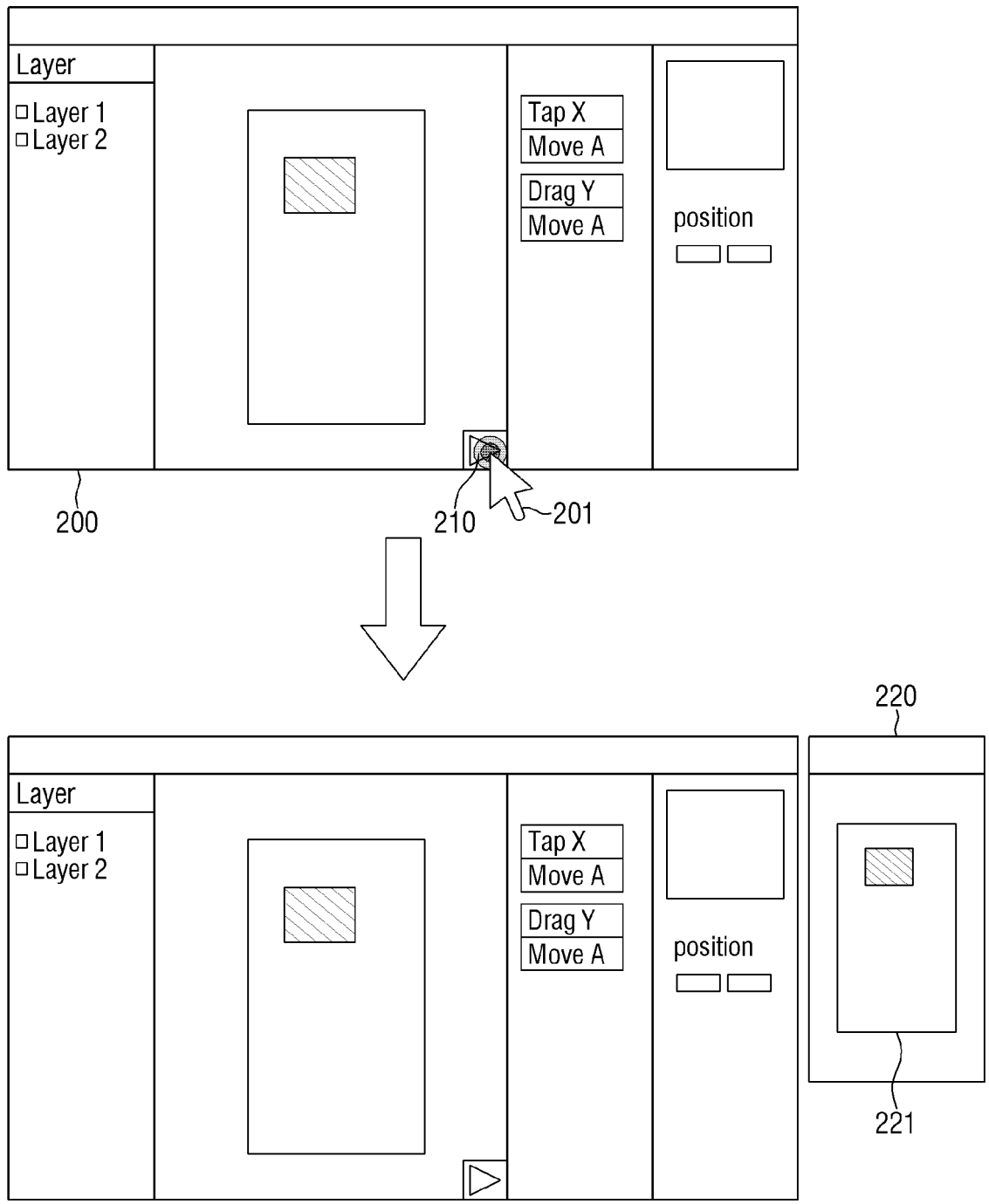
FIG. 2 illustrates a screen in which a conventional digital content authoring tool uses an instance to simulate digital content.

Prior to the description of the present disclosure, reference will be made to FIG. 2 so as to describe differences from a conventional art. FIG. 2 illustrates a screen in which a conventional digital content authoring tool 200 uses an instance 220 to simulate digital content.

To simulate digital content produced by the conventional digital content authoring tool 200, a user's input 201 to a UI object 210 having a function of simulating digital content is required. In response to the user's input 201, the instance 220 is created, and the digital content is simulated as indicated by reference numeral 221. Therefore, a user's input is required to simulate digital content, and an instance has to be used to display the simulated digital content.

The present disclosure does not require an instance and a user's input to simulate digital content. Therefore, the efficiency of the digital content authoring tool can be improved. The present disclosure will now be described in detail with reference to FIGS. 3 through 16.

The method according to the current embodiment may be executed by a computing device. The computing device may be the digital content authoring terminal 110 of FIG. 1. The digital content authoring terminal 110 may be a device in which the digital content authoring tool is installed. The digital content authoring tool may be software basically installed at the time of manufacturing the digital content authoring terminal 110 or may be application software installed by a user.

Figure 3:
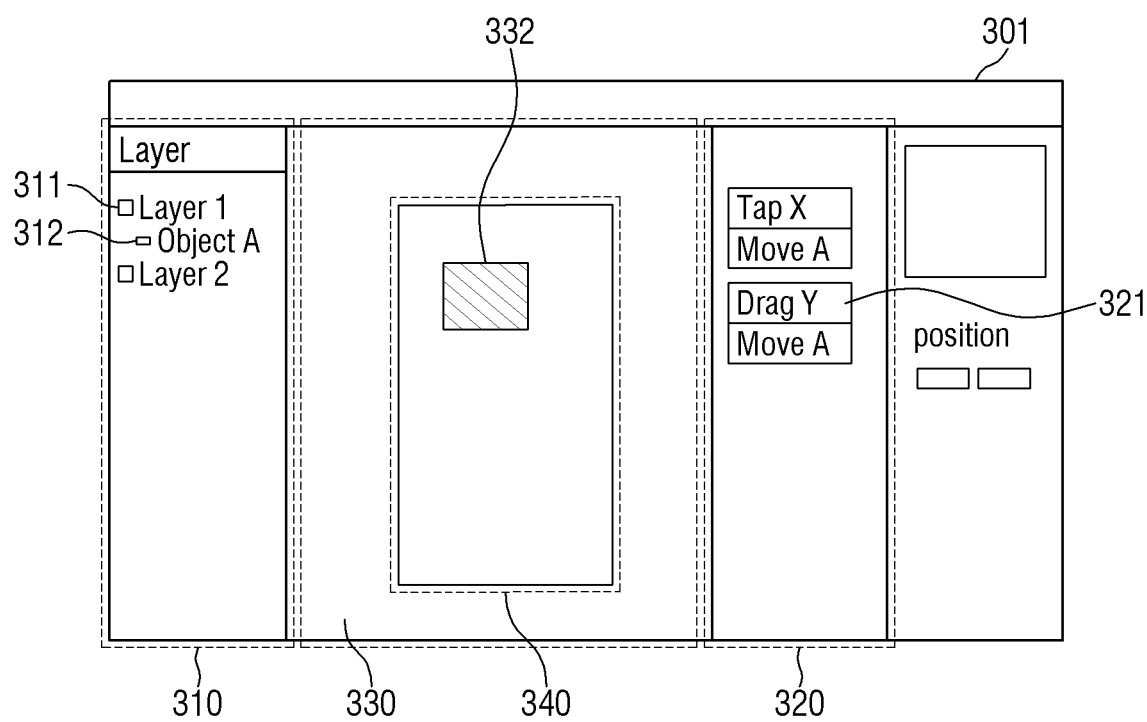
FIG. 3 illustrates a graphic user interface (GUI) that can be displayed on a computing device for executing a method of automatically switching a mode of a work area of a digital content authoring tool according to an embodiment.

Referring to FIG. 3, a graphic user interface (GUI) 301 of a digital content authoring tool according to an embodiment may further include a work area 330, a first area 310 in which a first UI object for editing static elements of an object 332 constituting digital content is located, and a second area 320 in which dynamic elements of the object 332 are edited.

The static elements, as used herein, denote static characteristics of the object 332 constituting the digital content and characteristics that can be identified without simulating the digital content. For example, in the case of a prototyping tool of an application, editing a layer which is an area to be divided by a user in an edit mode or changing or adding the position of an object is called editing a static element.

The dynamic elements, as used herein, denote dynamic characteristics of the object 332 constituting the digital content and characteristics that can be identified by simulating the digital content. For example, in the case of the prototyping tool, editing and executing a trigger which is a user's input to a prototype, a response which is a response of the prototype to the trigger, and an interaction which indicates the connection relationship between the trigger and the response are called editing dynamic elements.

To facilitate understanding, embodiments of the present disclosure will be described based on the assumption that the digital content authoring tool is a prototyping tool. However, it should be noted that the scope of the present disclosure is not limited to the prototyping tool.

The prototyping tool 301 may have an interface including the first area 310 in which static elements can be edited, that is, objects and layers can be added, removed and modified, the second area 320 in which dynamic elements can be edited, that is, triggers and responses can be added, removed and modified, and the work area 330 in which a produced prototype is displayed.

The first area 310 is composed of first UI objects 311 and 312 that function to add and edit layers and objects of a prototype. For example, when a user desiring to display layer 1 of the prototype selects a first UI object 311 having a function of displaying layer 1, layer 1 may be displayed in the work area 330. If a first UI object 321 for editing object A 332 is selected, object A 332 can be edited.

According to an embodiment, selecting a first UI object may cause a mode of the work area 330 to be switched to an edit mode in addition to making it possible to edit static elements. The edit mode will be described in detail later with reference to FIGS. 4 and 5.

The second area 320 may be composed of second UI objects 321 that function to add and edit triggers and responses of a prototype. For example, if a user desires to set object A 332 to move as a response when the user's drag trigger is input to object A 332, the user may select a second UI object 321 performing this function to set a trigger and a response for object A 332.

According to an embodiment, selecting a second UI object 321 may cause the mode of the work area 330 to be switched to an execution mode in addition to making it possible to edit dynamic elements. The execution mode will be described in detail later with reference to FIGS. 6 and 7.

The work area 330 displays a prototype produced by the prototyping tool. In addition, the work area 330, as well as the first area 310 and the second area 320, may perform prototyping by receiving a user's input. For example, to modify the position of the object 332, the object 332 may be moved by selecting and dragging the object 332 located in the work area 330. In addition, the position of a simulation area 340 may be changed by selecting and dragging the simulation area 340. A case where not all of the simulation area 340 is displayed in the work area 330 will be described in detail later with reference to FIG. 7.

In addition, the work area 330 may perform different operations in the edit mode and the execution mode according to a user's input, and, when the mode of the work area 330 is switched, the GUI of the prototyping tool may be changed to increase the user's intuition. This will be described in detail later with reference to FIGS. 4 through 7.

The simulation area 340 is an area that must be secured to execute a prototype and is a portion that is displayed on a screen of the prototype execution terminal when the prototype is executed. When the mode of the work area 330 is switched, a frame surrounding the simulation area 340 may be added or removed so that a user can distinguish the mode of the work area 330.

A case where the mode of the work area 330 is switched from the execution mode to the edit mode will now be described with reference to FIG. 4.

In a state where the work area 330 of the prototyping tool is in an execution mode 330a, if a user selects a first UI object 311, the mode of the work area 330 is automatically switched from the execution mode 330a to an edit mode 330b.

For example, in the state where the work area 330 is in the execution mode 330a, if a user selects the UI object 311 having the function of displaying layer 1, the mode of the work area 330 is automatically switched to the edit mode 330b without the user's input because the user will have to use the edit mode 330b to edit a layer and an object in the work area 330. If the user selects the first UI object 311 in a state where the work area 330 of the prototyping tool is already in the edit mode 330b, the mode of the work area 330 may not be switched.

According to an embodiment, when the mode of the work area 330 is switched to the edit mode 330b, a pointer 402 in the simulation area 340 in the execution mode 330a may be changed to another shape 302. Through this change in the pointer 402, a user can intuitively recognize an input to a prototype simulated by the prototype execution terminal.

According to an embodiment, a frame 341 surrounding the simulation area 340 in an interface of the work area 330 may be removed when the mode of the work area 330 is switched to the edit mode 330b. For example, the frame 341 surrounding the simulation area 340 may take the form of the prototype execution terminal. Therefore, a user may intuitively recognize that the work area 330 of the prototyping tool is in the execution mode 330a and that a prototype can be simulated in the execution mode 330a as on the prototype execution terminal. The change in the interface of the work area 330 may increase the intuitiveness of mode switching of the work area 330.

Figure 5:
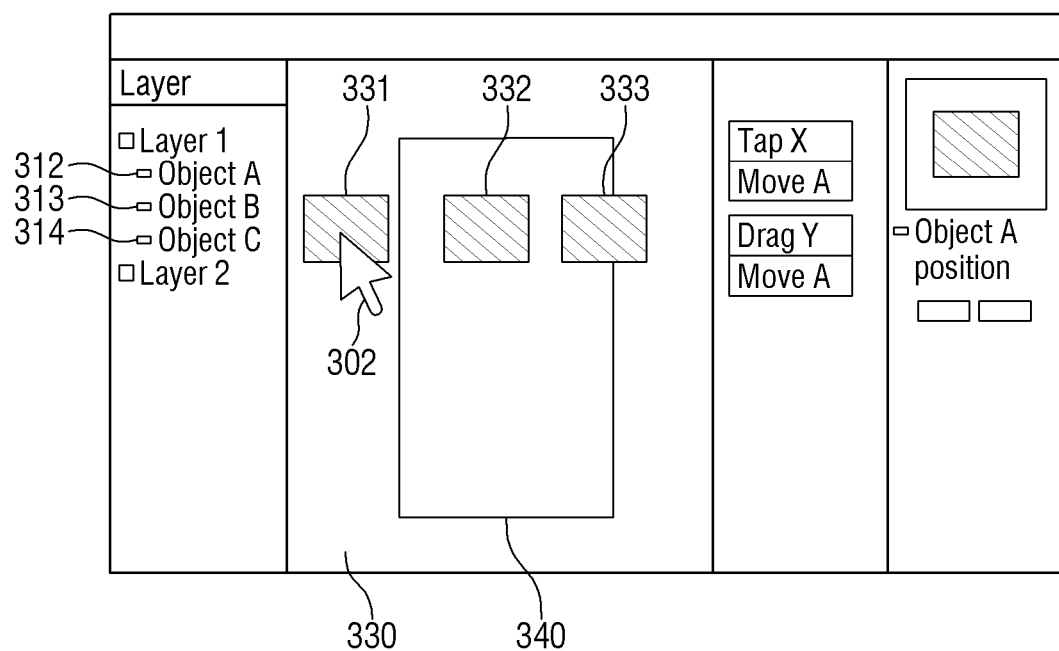
FIG. 5 illustrates a screen displayed when the work area of the digital content authoring tool is in the edit mode according to an embodiment.

FIG. 5 illustrates a screen displayed when the work area 330 of the digital content authoring tool is in the edit mode according to an embodiment.

According to an embodiment, in the edit mode, it should be possible to edit not only objects 332 and 333 existing inside the simulation area 340 and displayed for prototype simulation in the execution mode but also an object 331 existing outside the simulation area 340. When the mode of the work area 330 is switched to the edit mode by the selection of first UI objects 312, 313 and 314, the object 331 existing outside the simulation area 340 and not displayed in the execution mode is displayed. Objects not displayed in the execution mode will be described later with reference to FIG. 6. Since the object 331 existing outside the simulation area 340 is displayed, a user can also recognize that the work area 330 is in the edit mode 330b.

For example, when the mode of the work area 330 is switched to the edit mode 330b after a user selects the first UI object 312 to display object A 331, not only the objects 332 and 333 displayed inside the simulation area 340 but also the object 331 located outside the simulation area 340 and a portion, which exists outside the simulation area 340, of the object 333 located at a boundary of the simulation area 340 are displayed.

Figure 6:
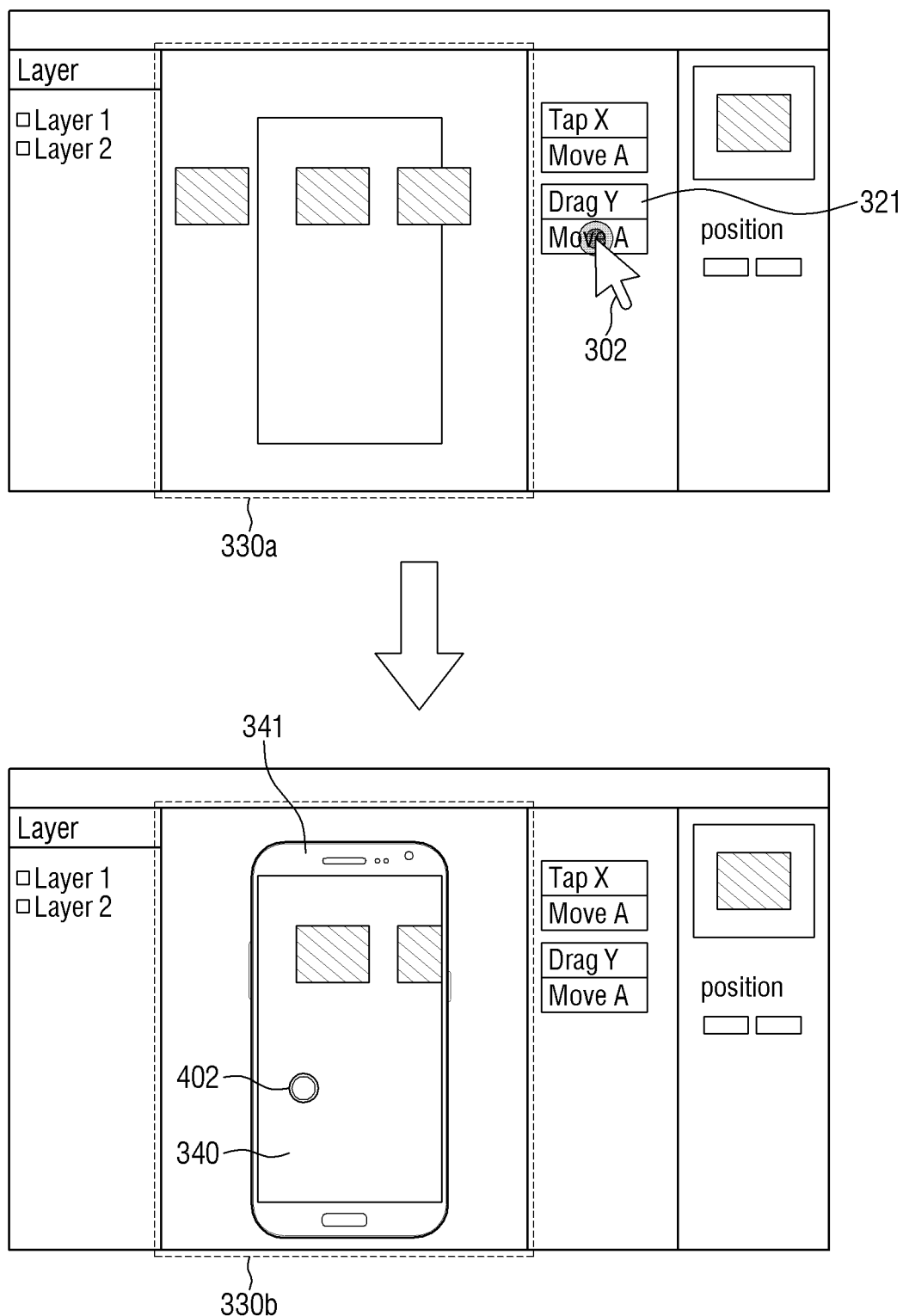
FIG. 6 illustrates the work area whose mode is switched from the edit mode to the execution mode when a second UI object is selected according to an embodiment.
Figure 7:
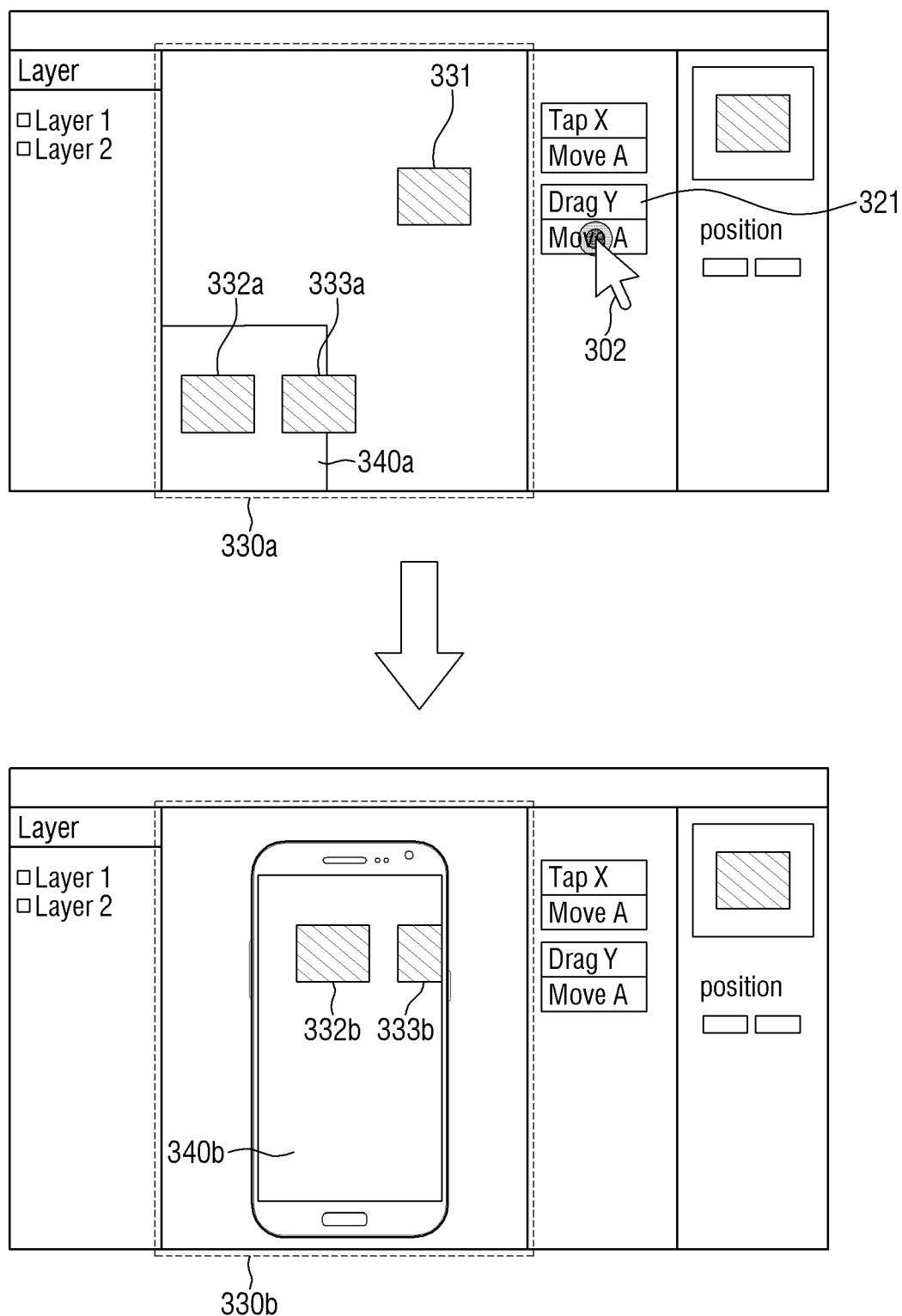
FIG. 7 illustrates the work area whose mode is switched to the execution mode by selection of a second UI object when a viewpoint is outside a simulation area in the edit mode according to an embodiment.

FIGS. 6 and 7 illustrate a screen displayed when the mode of the work area 330 of the digital content authoring tool is switched to the execution mode according to an embodiment.

A case where the mode of the work area 330 is switched from the edit mode to the execution mode will now be described with reference to FIG. 6. In a state where the work area 330 of the prototyping tool is in the edit mode 330a, if a user selects a second UI object 321 as indicated by reference numeral 302, the work area 330 may be switched from the edit mode 330a to the execution mode 330b.

For example, in the state where the work area 330 is in the edit mode 330a, if a user selects a second UI object 321 having a function of defining an interaction in which object A moves in response to the user's drag input, the mode of the work area 330 is automatically switched to the execution mode 330b without the user's input because the user will simulate a prototype in the work area 330 to check the function after the selection 302. If the user selects the second UI object 321 in the state where the work area 330 of the prototyping tool is already in the execution mode 330b, the mode of the work area 330 may not be switched.

According to an embodiment, if the mode of the work area 330 is switched to the execution mode 330b, the shape of the pointer may be changed to a shape 402 different from that of the pointer 302 in the edit mode 330a as the pointer enters the simulation area 340. If the pointer is changed as it enters the simulation area 340 in the execution mode 330b, a user can recognize that a user input to a prototype executed by the prototype execution terminal is simulated.

According to an embodiment, when the mode of the work area 330 is switched to the execution mode 330b, the frame 341 surrounding the simulation area 340 may be added to the interface of the work area 330. For example, if a prototype being produced is a prototype of an application executed on a smartphone terminal, the frame 341 in the form of the smartphone may be added to the outside of the simulation area 340. As the frame 341 is added to the outside of the simulation area 340, a user may intuitively recognize that the application of the smartphone can now be simulated in the work area 330.

A case where an object outside the simulation area 340 is not displayed when the mode of the work area 330 is switched to the execution mode 330b and a change in viewpoint will now be described with reference to FIG. 7.

According to an embodiment, since only an area displayed on the prototype execution terminal is simulated in the execution mode 330b, there is no need to simulate a prototype interface existing outside the simulation area 340b. Therefore, when the mode of the work area 330 is switched to the execution mode 330b, an object existing outside the simulation area 340b is not displayed. In addition, since the object existing outside the simulation area 340b is not displayed, a user can recognize that the work area 330 is in the execution mode 330b.

For example, when the work area 330 is in the edit mode 330a, an object 332a located inside the simulation area 340a, an object 331 located outside the simulation area 340a, and an object 333a located at the boundary of the simulation area 340a are displayed. Then, when the mode of the work area 330 is switched to the execution mode 330b, the object 331 existing outside the simulation area 340b is not displayed, whereas the object 332b existing inside the simulation area 340b and a portion, which belongs to the simulation area 340b, of the object 333 located at the boundary of the simulation area 340b are displayed.

According to an embodiment, since a prototype should be simulated in the execution mode 330b, the whole of the simulation area 340b that must be secured for the simulation of the prototype should be displayed. Therefore, if the viewpoint is outside the simulation area 340a in the edit mode 330a, the viewpoint of the work area 330 may be changed when the mode of the work area 330 is switched to the execution mode 330b. For example, when the viewpoint of the work area 330 is at a center of the simulation area 340b, the simulation area 340b is located in the middle of the work area 330. Therefore, when the mode of the work area 330 is switched to the execution mode 330b, the viewpoint of the work area 330 is adjusted to display the entire simulation area 340b.

For example, if the object 331 is edited to be located outside the simulation area 340a in the work area 330, not all of the simulation area 340 may be displayed in the work area 330 because the viewpoint is at the object 331. In this case, if the mode of the work area 330 is switched because a second UI object 321 for dynamic editing of a prototype is selected as indicated by reference numeral 302 in FIG. 7, the viewpoint is changed to display the entire simulation area 340a in the work area 330. If the work area 330 of the prototyping tool displays the entire simulation area 340a as illustrated in FIG. 6, the viewpoint may not be changed even when the mode of the work area 330 is switched.

Figure 8:
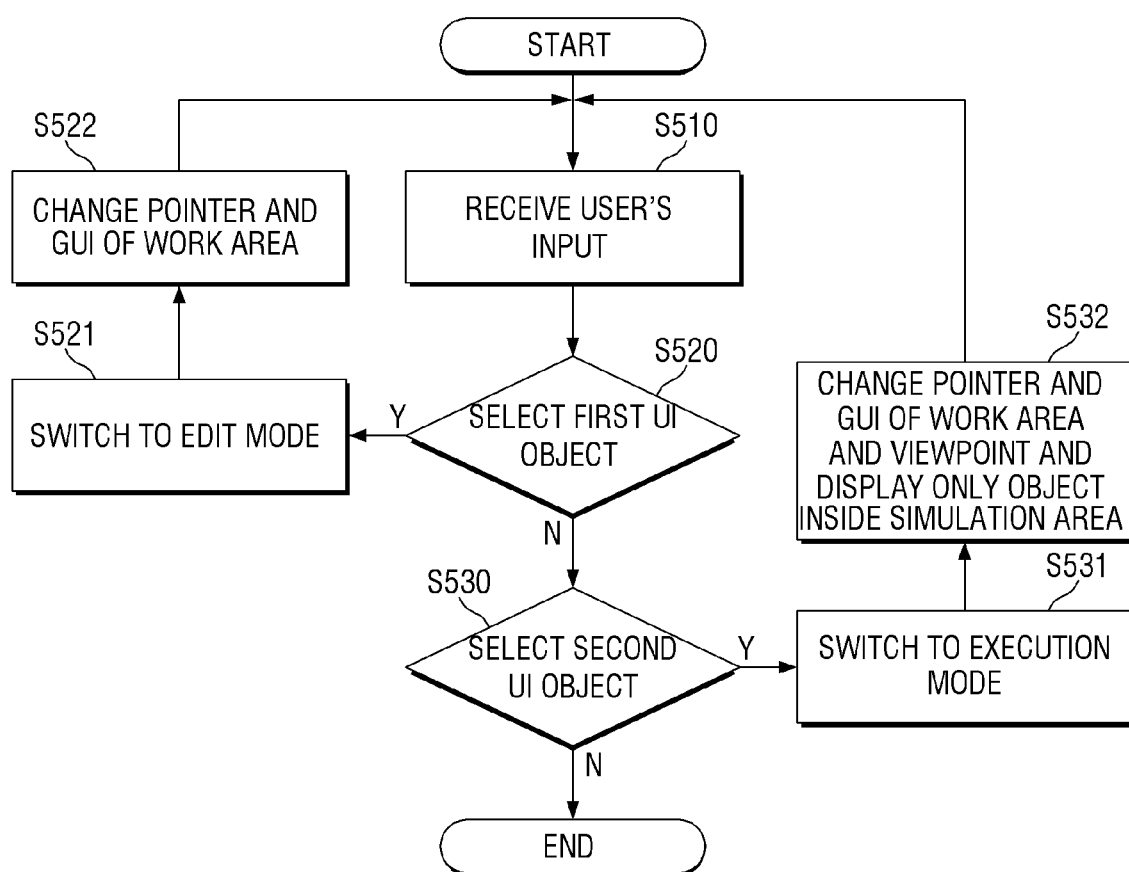
FIG. 8 is a flowchart illustrating a method of automatically switching the mode of the work area of the digital content authoring tool when a user selects a UI object according to an embodiment.

FIG. 8 is a flowchart illustrating a process of automatically switching a mode of a work area in response to a user's input to a digital content authoring tool according to an embodiment.

Referring to FIG. 8, a digital content authoring terminal may receive a user's input to a UI object on a GUI of the digital content authoring tool in operation S510. For example, the user's input may be an input to the work area or an input to a first UI object or a second UI object.

In operation S520, the user may select a first UI object to edit static elements. After performing the function, the user is highly likely to check edited digital content or perform editing similar to the function of the first UI object. Therefore, the mode of the work area is automatically switched to an edit mode in operation S521. If the work area is already in the edit mode before the user's input is received, the mode of the work area may not be switched.

According to an embodiment, when the mode of the work area is switched to the edit mode, a pointer and an interface of the work area may be changed. Accordingly, the user can intuitively recognize the mode switch in operation S522.

In operation S530, the user may select a second UI object to edit dynamic elements. After performing the function, the user is highly likely to execute digital content to check whether the digital content correctly responds to a trigger intended by the user or perform editing similar to the function of the second UI object. Therefore, the mode of the work area is automatically switched to an execution mode in operation S531. If the work area is already in the execution mode before the user's input is received, the mode of the work area may not be switched.

According to an embodiment, when the mode of the work area is switched to the execution mode, the shape of the pointer and the interface of the work area may be changed. Accordingly, the user can intuitively recognize the mode switch in operation S532.

According to an embodiment, it should be possible to simulate the digital content in the execution mode. Therefore, a viewpoint may be placed at a simulation area that must be secured to simulate the digital content, and only an object located inside the simulation area may be displayed in operation S532.

The automatic mode switching of the work area may be repeatedly performed according to the user's input while the user uses the digital content authoring tool.

A method of automatically switching the mode of the work area in response to a mouseover input to a specific area in the GUI of the digital content authoring tool will now be described with reference to FIGS. 9 through 12.

Referring again to FIG. 3, in an embodiment, the GUI of the digital content authoring tool may be configured such that the work area 330 is located between the first area 310 and the second area 320 in order to clearly distinguish which of the first area 310 and the second area 320 the pointer enters. In FIG. 3, the first area 310, the second area 320 and the work area 330 are arranged horizontally. However, the configuration of the GUI of the digital content authoring tool of the present disclosure is not limited to this example, and the first area 310, the second area 320 and the work area 330 can be arranged in various forms. A prototype will be described below as an example of digital content.

Figure 9:
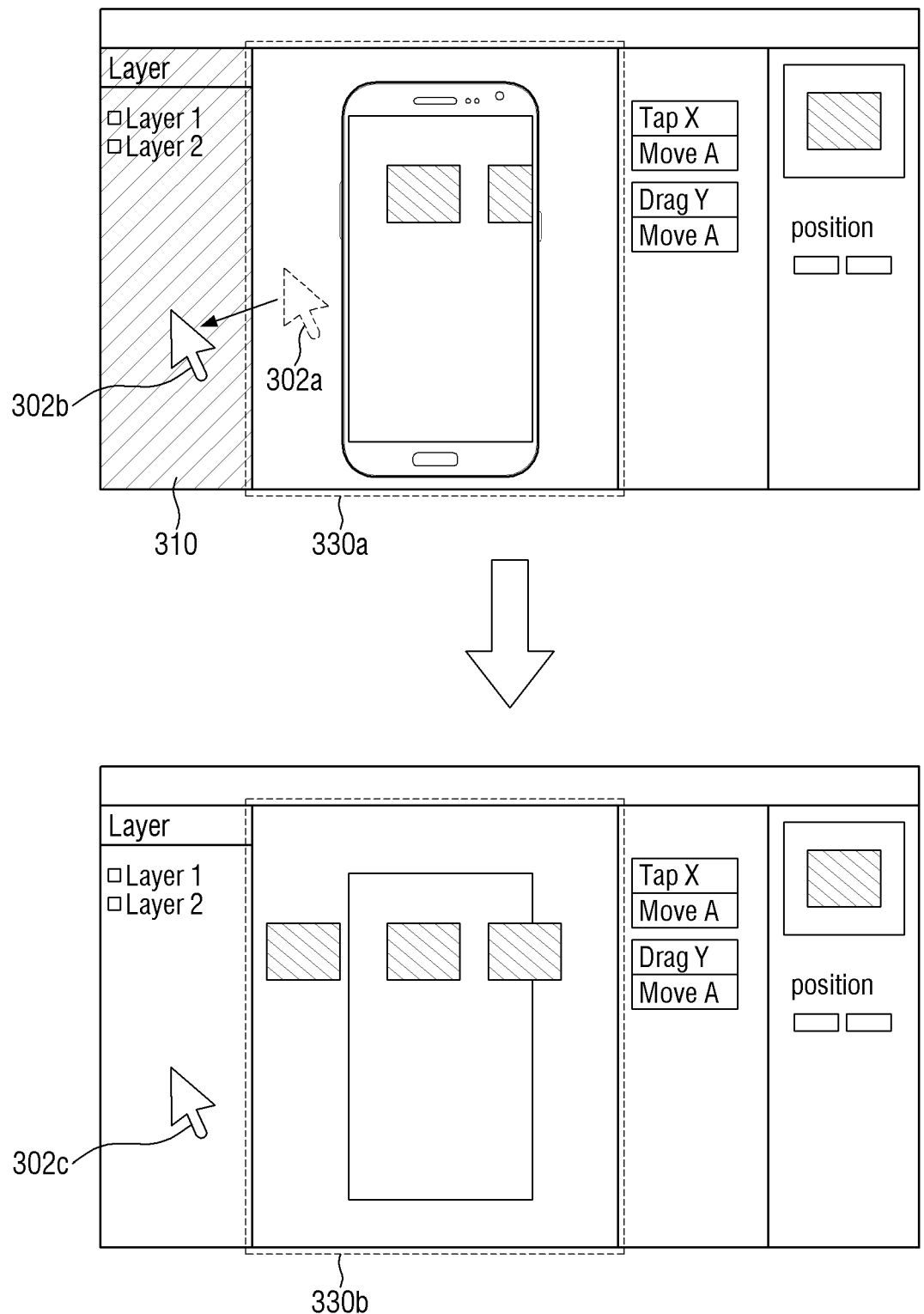
FIG. 9 illustrates the work area whose mode is switched to the edit mode by a user's mouseover input to a first area according to an embodiment.

Referring to FIG. 9, when the work area 330 is in the execution mode 330a, if a user mouse-overs (302a and 302b) the first area 310 in which static elements of the prototype can be edited, it can be predicted even before a first UI object in the first area 310 is selected that the user will edit the static elements. Therefore, the mode of the work area 330 is switched to the edit mode 330b in response to the mouseover input 302a and 302b to the first area 310.

Figure 4:
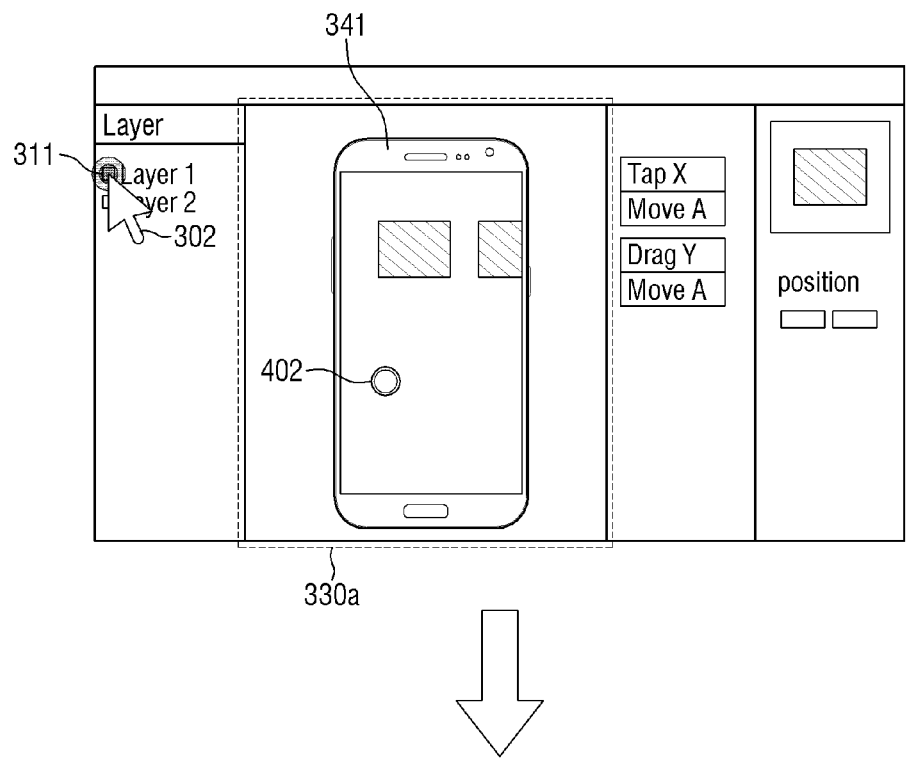
FIG. 4 illustrates the work area whose mode is switched from an execution mode to an edit mode when a first UI object is selected according to an embodiment.
Figure 4:
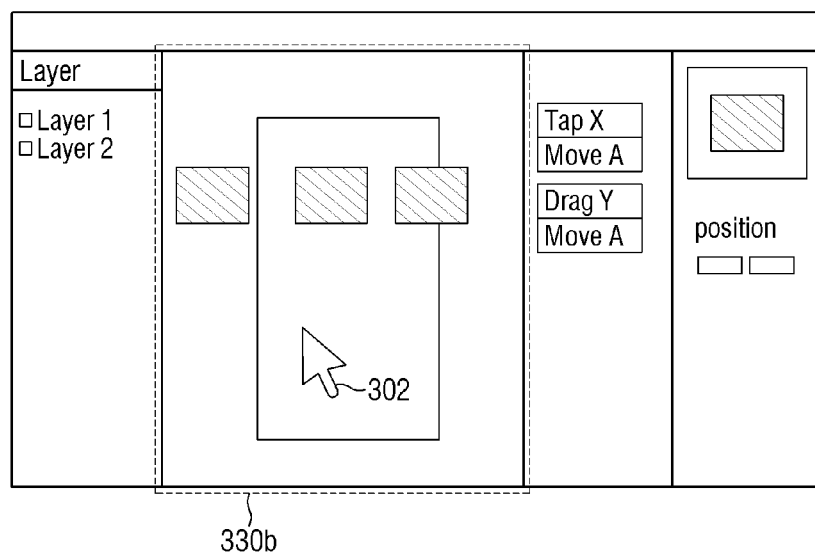

According to an embodiment, when the mode of the work area 330 is switched to the edit mode 330b, the frame 341 surrounding the simulation area 340 of the prototyping tool may be removed, or the mouse pointer 302c may be changed as described in FIG. 4, thereby increasing the user's intuition of the mode switch.

Figure 10:
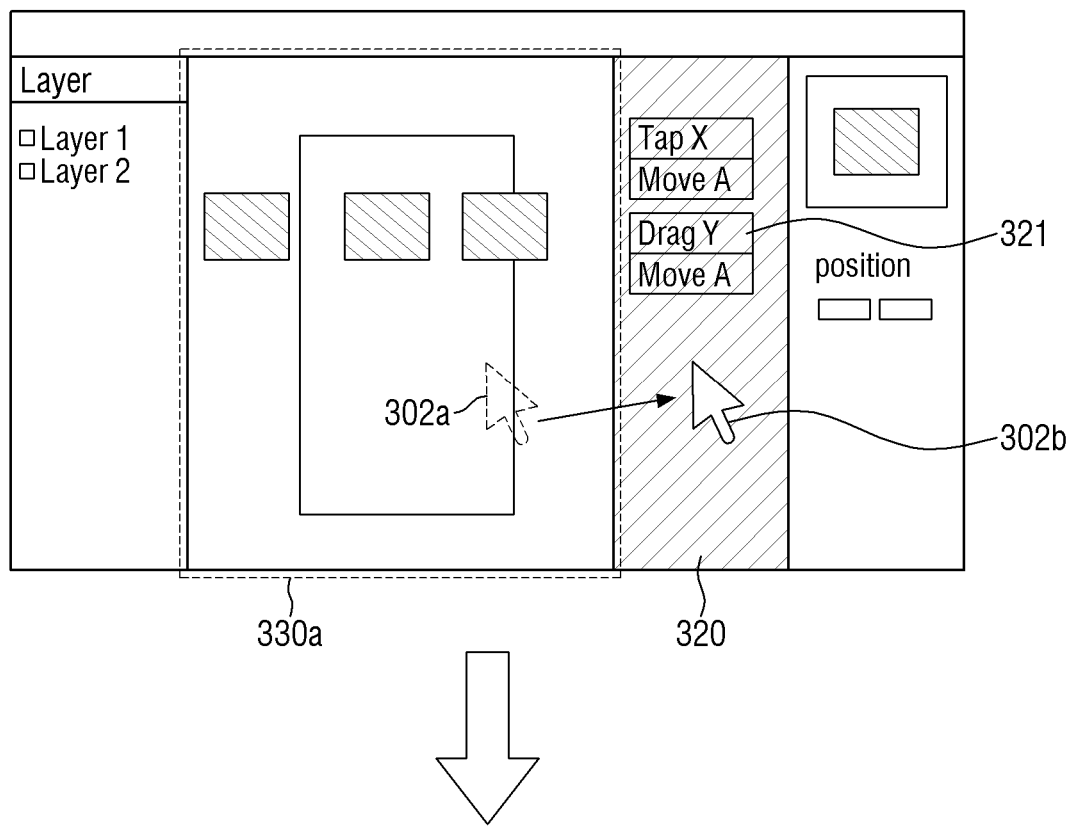
FIG. 10 illustrates the work area whose mode is switched to the execution mode by a user's mouseover input to a second area according to an embodiment.
Figure 10:
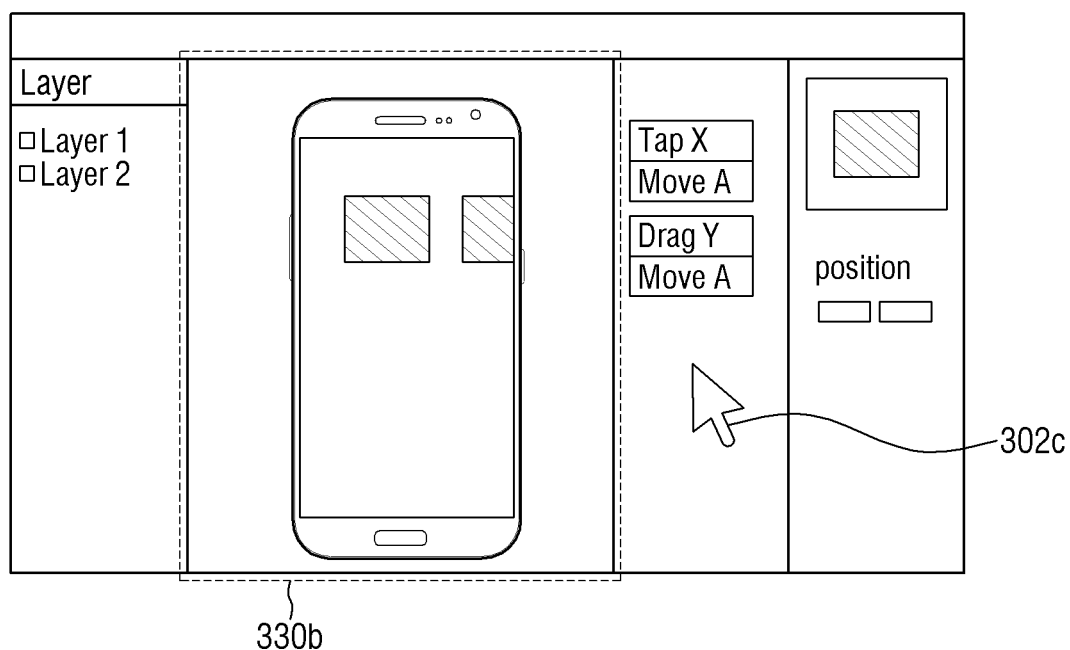

Referring to FIG. 10, when the work area 330 is in the edit mode 330a, if the user mouseovers (302a and 302b) the second area 320 in which dynamic elements of the prototype can be edited, it can be predicted even before a second UI object in the second area 320 is selected that the user will edit the dynamic elements. Therefore, the mode of the work area 330 is switched to the execution mode 330b in response to the mouseover input 302a and 302b to the second area 320.

According to an embodiment, when the mode of the work area 330 is switched to the execution mode 330b, the frame 341 may be added to surround the simulation area 340 of the prototyping tool, or the mouse pointer may be changed as described in FIGS. 6 and 7, thereby increasing a user's intuition of the mode switch.

However, if the mode of the work area 330 is switched by considering only an area that the pointer enters, when a user desires to select a UI object in another area by passing the area that the pointer enters, an unnecessary mode switch may occur against the user's intention.

Therefore, according to an embodiment, the screen of the work area 330 may be switched in consideration of whether the pointer 302a, 302b and 302c stays in the first area 310 or the second area 320 for a reference time or longer, whether the moving speed of the pointer is lower than a reference speed, coordinates of a position where the pointer stays, etc. In this case, the probability of unnecessary mode switching can be reduced. The reference time, the reference speed, and the coordinates of a specific position may be values designated by a user or may be average values calculated using the user' data. However, embodiments are not limited to this case, and the reference time, the reference speed and the coordinates of the specific position may be determined through various operations and statistics.

Figure 11:
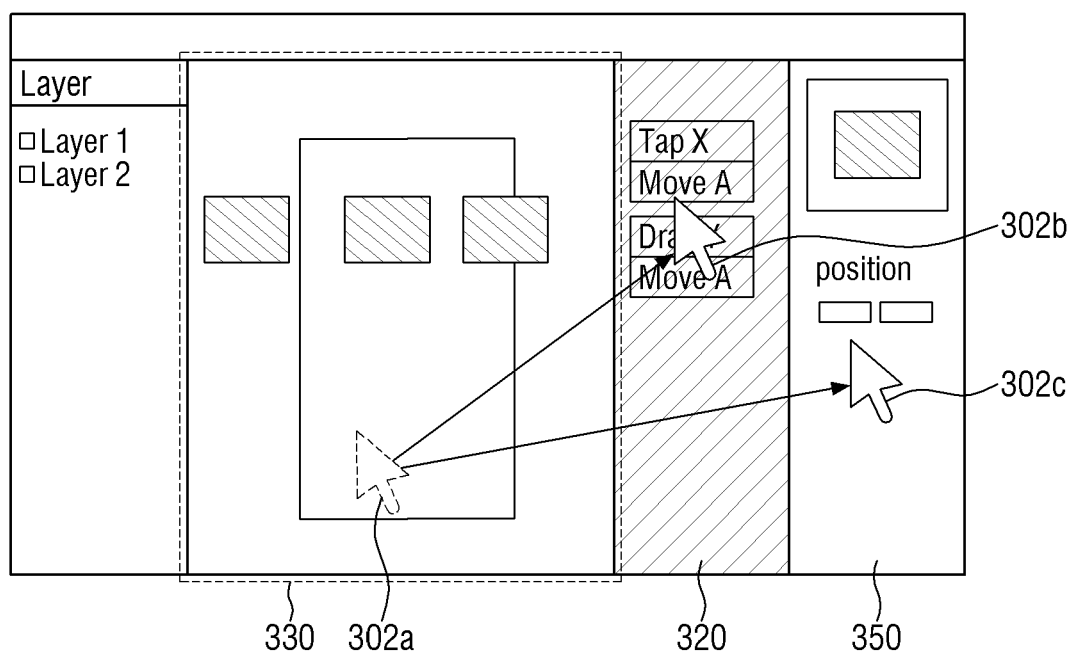
FIG. 11 is a diagram for explaining, in detail, a mouseover for switching the mode of the work area according to an embodiment.

For example, referring to FIG. 11, when a user passes the second area 320 to go to another area 350 instead of the second area 320, it is not efficient to switch the mode of the work area 330 to the execution mode just because the mouse enters the second area 320. In this case, the pointer 302a and 302c will pass the second area 320 at a speed equal to or higher than the reference speed, unlike when entering the second area 320 to select a second UI object. Therefore, the mode of the work area 330 is not switched to the execution mode.

However, if the user mouse-overs (302a and 302b) the second area 320 to use a second UI object, the pointer moves in the second area 320 at a speed lower than the reference speed and stays in the second area 320 for the reference time or longer. Therefore, the mode of the work area 330 is switched to the execution mode.

Figure 12:
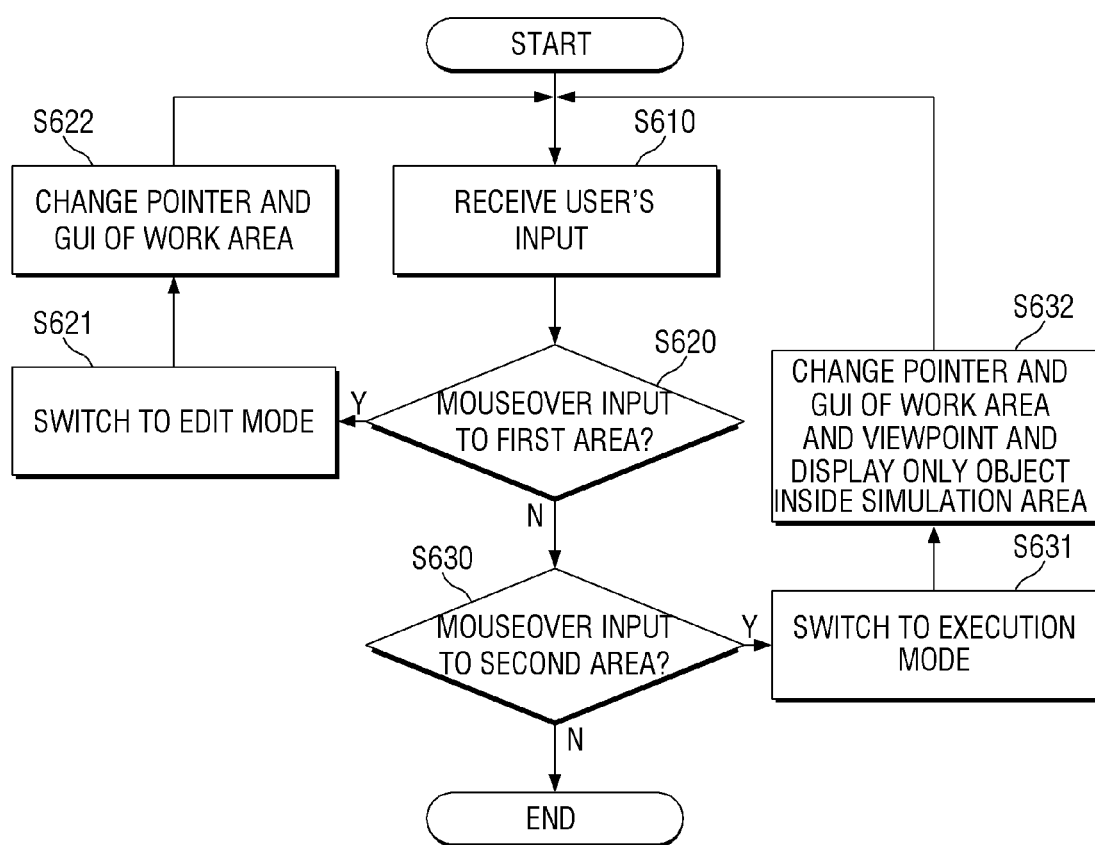
FIG. 12 is a flowchart illustrating a method of automatically switching the mode of the work area of the digital content authoring tool in response to a user's mouseover input to a specific area according to an embodiment.

FIG. 12 is a flowchart illustrating a method of automatically switching a mode of a work area of a digital content authoring tool in response to a user's mouseover input to a specific area according to an embodiment Referring to FIG. 12, a digital content authoring terminal may receive a user's input to a UI object on a GUI of the digital content authoring tool in operation S610.

When there is a user's mouseover input to a first area in which first UI objects having a function of editing static elements of objects are located in operation S620, the mode of the work area may be automatically switched to an edit mode in operation S621 according to the user's intention to select a first UI object.

For example, when a pointer enters the first area to select a UI object for adding a layer in operation S620, the mode of the work area may be switched to the edit mode in operation S621. However, if the work area is already in the edit mode before the user's input is received, the mode of the work area may not be switched.

According to an embodiment, when the mode of the work area is switched to the edit mode, the pointer and a GUI of the work area are changed in operation S622 so that the user can intuitively recognize the mode switch.

When there is the user's mouseover input to a second area in which second UI objects having a function of editing dynamic elements of objects are located in operation S630, the mode of the work area may be automatically switched to an execution mode in operation S631 according to the user's intention to select a second UI object.

For example, when the pointer enters the second area to select a UI object for adding a response of an object, the mode of the work area may be switched to the execution mode. However, if the work area is already in the execution mode before the user's input is received, the mode of the work area may not be switched.

According to an embodiment, when the mode of the work area is switched to the execution mode, the pointer and the GUI of the work area are changed in operation S632 so that the user can intuitively recognize the mode switch.

The automatic mode switching of the work area described above may be repeatedly performed according to the user's input while the user uses the digital content authoring tool.

A method of automatically switching the mode of the work area of the digital content authoring tool 301 according to a user's input to an area outside the simulation area when the work area of the digital content authoring tool is in the execution mode will now be described with reference to FIGS. 13 through 15. A prototype will be described below as an example of digital content.

Figure 13:
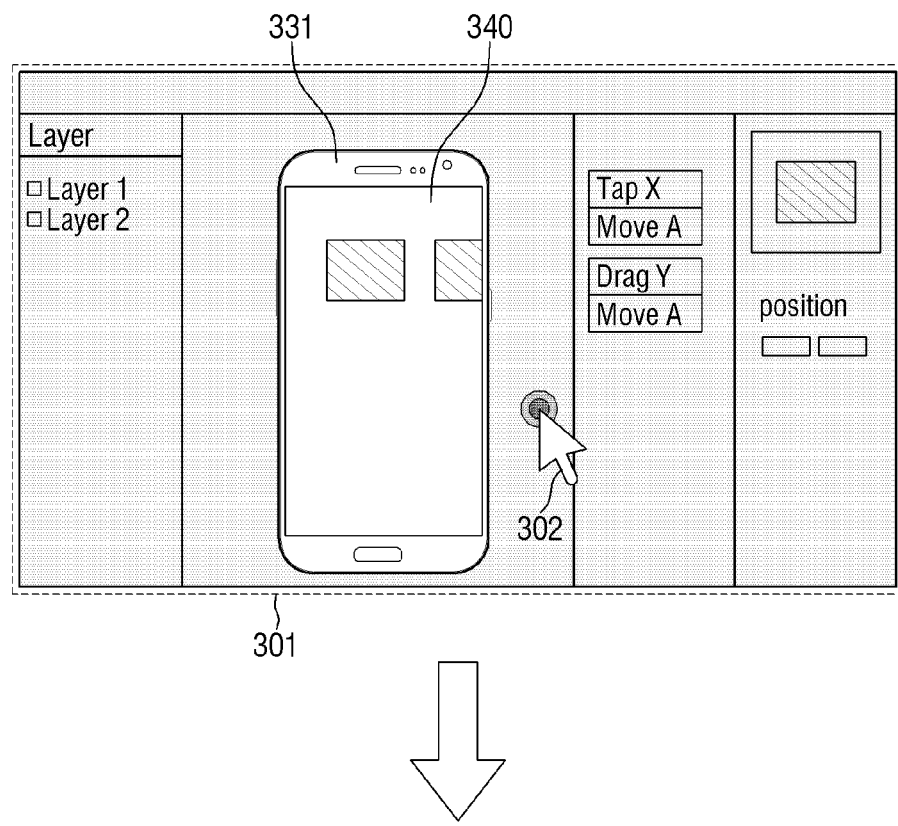
FIG. 13 illustrates the work area whose mode is switched to the edit mode by a user's input to an area outside the simulation area when the work area is in the execution mode according to an embodiment.
Figure 13:
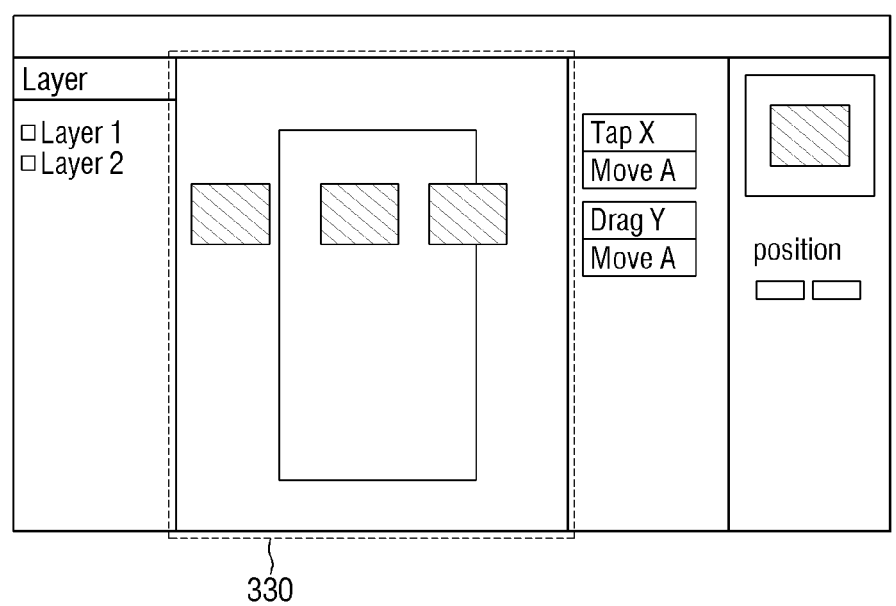
Figure 14:
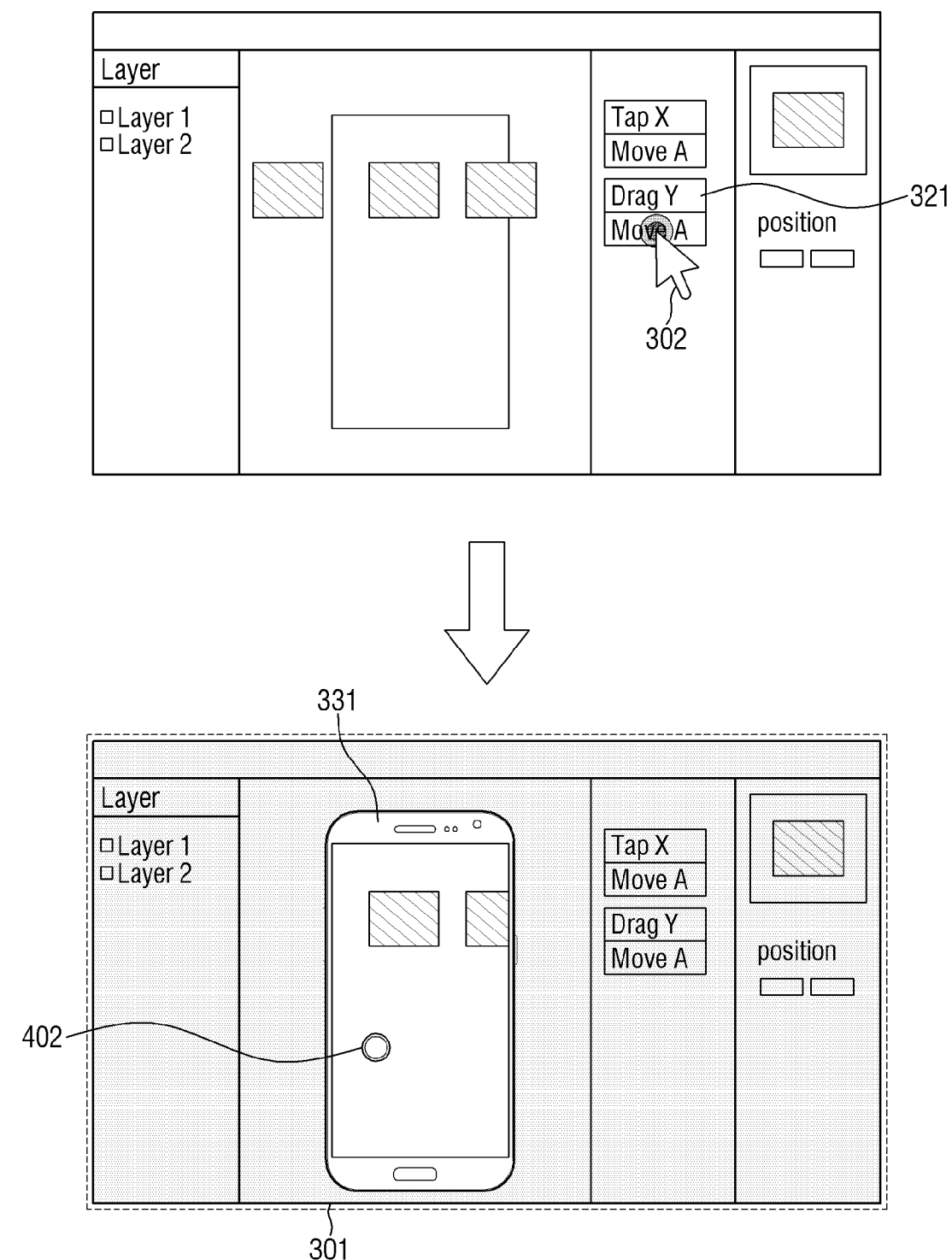
FIG. 14 illustrates a screen in which a UI object outside the simulation area is disabled and the mode of the work area is switched from the edit mode to the execution mode by selection of a second UI object according to an embodiment.

Referring to FIG. 13, when the work area 330 is in the execution mode, the mode of the work area 330 is switched to the edit mode in response to an input 302 to an area outside the simulation area 340 of the prototyping tool 301. Therefore, in the execution mode, a user cannot produce a prototype using a UI object outside the simulation area 340 and can only simulate a prototype in the simulation area 340.

According to an embodiment, when the work area 330 is in the execution mode, a GUI outside the simulation area 340 of the prototyping tool may be changed. For example, the area outside the simulation area 340 is shaded in FIG. 13. However, the area outside the simulation area 340 can also be blurred, defocused, etc. as long as it can be distinguished from the simulation area 340 and enable a user to intuitively recognize that a UI object outside the simulation area 340 has been disabled.

Therefore, when there is a user's input 302 to a UI object outside the simulation area 340, the mode of the work area 330 is automatically switched to the edit mode because it is considered that the user intends to end the execution mode and edit the GUI of the prototype.

A case where the mode of the work area 330 of the prototyping tool is switched to the execution mode when a user selects (302) a second UI 321 in the edit mode will be described with reference to FIG. 14.

For example, when there is a user's input 302 to a second UI object 321 having a function of defining an interaction in which object A moves as a response to the user's drag trigger, the mode of the work area 330 is switched to the execution mode. Since the execution mode is used to simulate a prototype in the simulation area 340, there is no problem in simulating the prototype even if a UI object outside the simulation area 340 is disabled. In addition, since the user can concentrate on the simulation area 340 if the UI object outside the simulation area 340 is disabled, the user's intuition of a mode switch of the work area 330 to the execution mode is increased.

According to an embodiment, when the mode of the work area 330 is switched to the execution mode, the frame 341 may be added to surround the outside of the simulation area 340 of the prototyping tool, or the mouse pointer 302 and 402 may be changed as described in FIGS. 6 and 7, thereby increasing the user's intuition of the mode switch.

Figure 15:
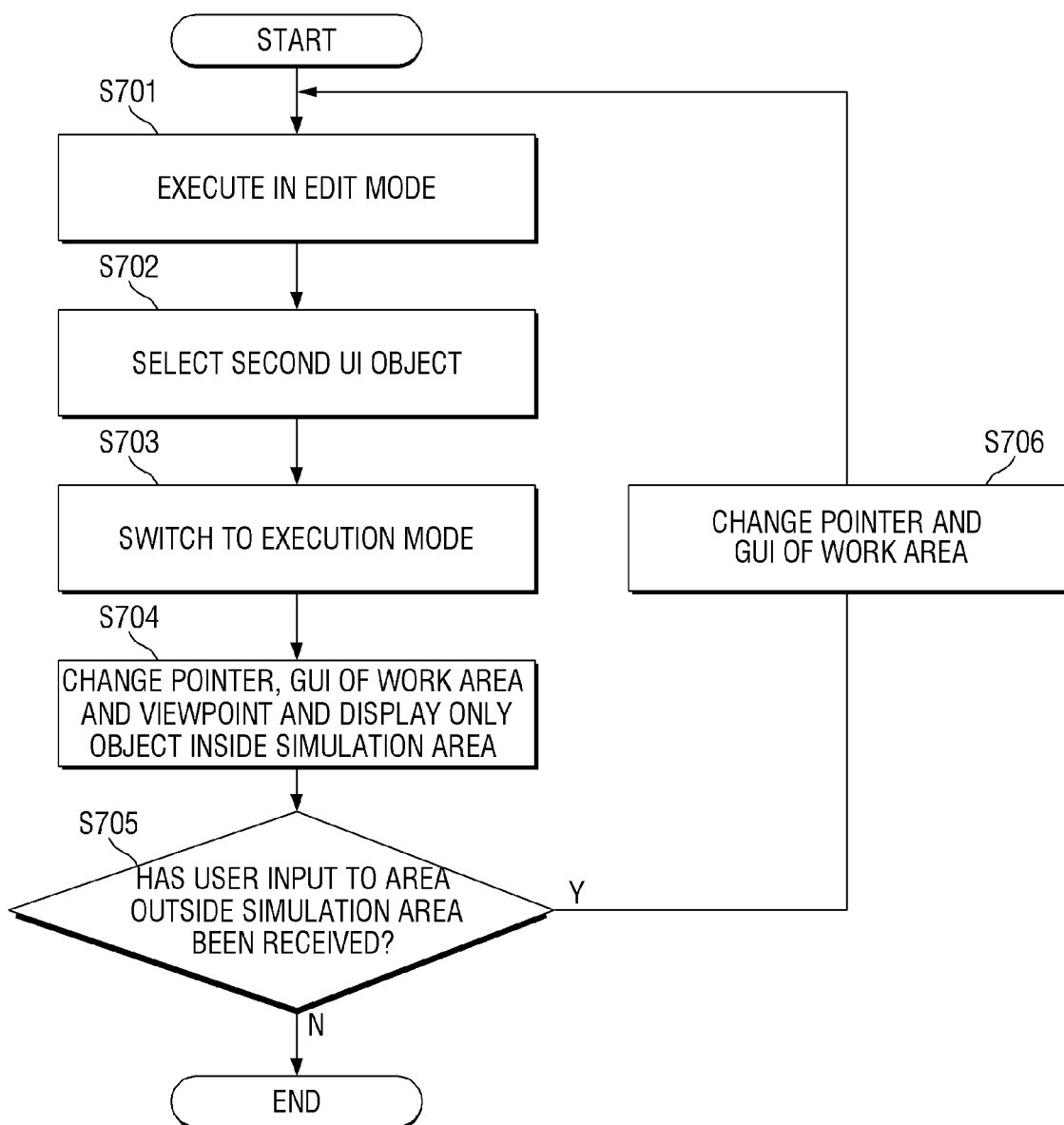
FIG. 15 is a flowchart illustrating a method of automatically switching the mode of the work area of the digital content authoring tool in response to a user input to the area outside the simulation area when the work area is in the execution mode according to an embodiment.

FIG. 15 is a flowchart illustrating a method of switching a mode of a work area of a digital content authoring tool by limiting a user input to an area outside a simulation area when the work area is in an execution mode according to an embodiment.

Referring to FIG. 15, a digital content authoring terminal executes the digital content authoring tool in an edit mode in operation S701. When a user first executes the digital content authoring tool to start digital content authoring, the user edits a GUI of digital content first by adding objects constituting the digital content. Therefore, the work area of the digital content authoring tool starts in the edit mode.

If the user selects a second UI object to edit dynamic elements in operation S702, the user is highly likely to execute the digital content so as to check whether the digital content correctly responds to a trigger intended by the user or to perform editing similar to the function of the second UI object. Therefore, the mode of the work area of the digital content authoring tool is switched to the execution mode in operation S703. If the work area is already in the execution mode before the user's input is received, the mode of the work area may not be switched.

According to an embodiment, when the mode of the work area is switched to the edit mode, a pointer and a GUI of the digital content authoring tool may be changed. Accordingly, the user can intuitively recognize the mode switch in operation S704.

In addition, when the work area of the digital content authoring tool is in the execution mode, a UI object outside the simulation area may be disabled. Since the user simulates the digital content in the simulation area in the execution mode, the user can concentrate on the simulation area if the UI object outside the simulation area is disabled.

When there is an input to the UI object outside the simulation area, the mode of the work area of the digital content authoring tool is switched again to the edit mode because it is considered that the user intends to edit the GUI of the digital content.

According to an embodiment, when the mode of the work area is switched to the edit mode, the pointer and a GUI of the work area may be changed. Accordingly, the user can intuitively recognize the mode switch in operation S706.

The automatic mode switching of the work area described above may be repeatedly performed according to the user's input while the user uses the digital content authoring tool.

Figure 16:
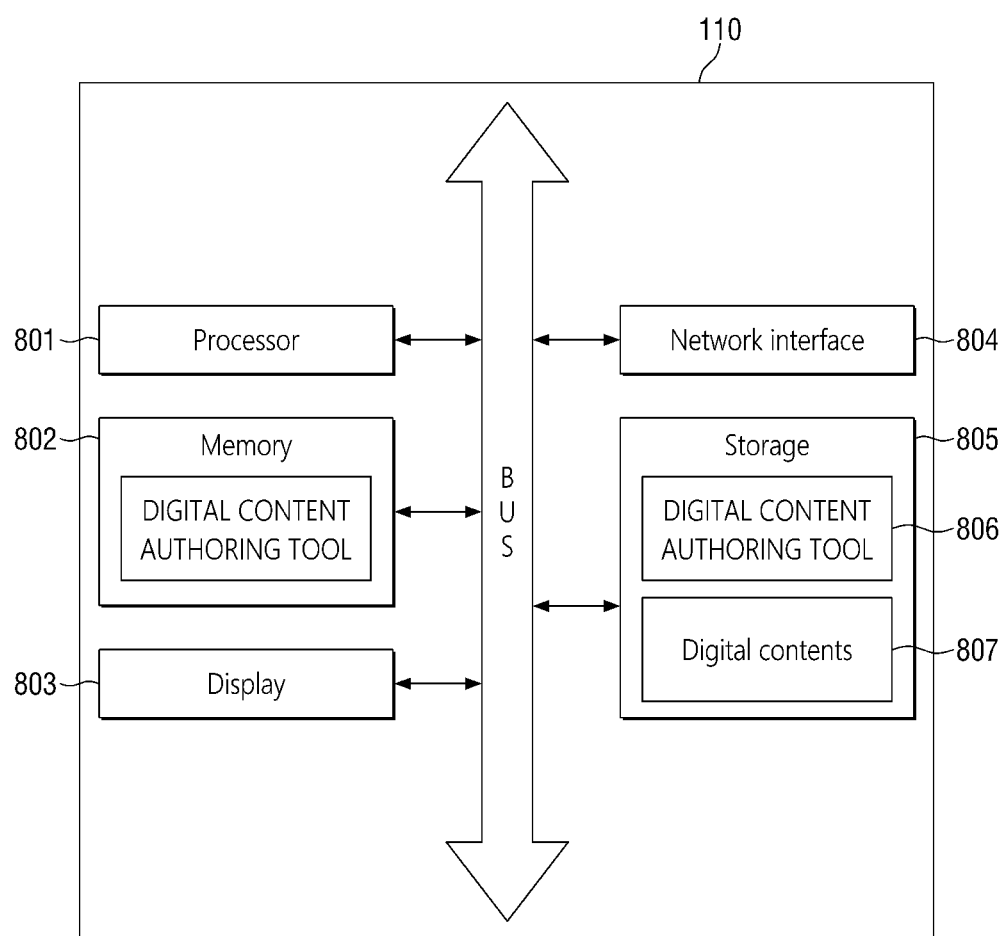
FIG. 16 is a schematic block diagram of a digital content authoring terminal according to an embodiment.

The digital content authoring terminal 110 will now be described in detail with reference to FIG. 16. FIG. 16 is a schematic block diagram of a digital content authoring terminal 110 according to an embodiment.

Referring to FIG. 16, the digital content authoring terminal 110 of FIG. 1 may include a processor 801, a memory 802, a display 803, a network interface 804, and a storage 805. In addition, although not illustrated, the digital content authoring terminal 110 may include an input unit (not illustrated) for receiving various inputs from a user of the authoring terminal 110.

The processor 801 controls the overall operation of each element of the authoring terminal 110. The processor 801 may include a central processing unit (CPU), a microprocessor unit (MPU), a micro-controller unit (MCU), or any form of processor well known in the art to which the present disclosure pertains. In addition, the processor 801 may perform an operation on at least one application or program for executing methods according to embodiments. The authoring terminal 110 may include one or more processors.

The memory 802 stores various data, commands and/or information. The memory 802 may load one or more programs 806 from the storage 805 in order to execute a digital content authoring method of an interface according to embodiments.

The display 803 may include a display module which displays a GUI of a digital content authoring tool. The display 803 may provide various information by displaying UI objects for editing layers on the GUI, UI objects for editing triggers and responses, and a work area and a simulation area for displaying digital content being authored.

In addition, the display 803 may receive a user input for controlling the digital content authoring terminal 110. According to an embodiment, the input/output unit may receive a user input through an input device. For example, a user input may be received through a separate input device such as a keyboard or a tablet computer or through a display having a touch screen.

The network interface 804 supports wired and wireless Internet communication of the authoring terminal 110. In addition, the network interface 804 may support various communication methods other than Internet communication. To this end, the network interface 804 may include various communication modules.

The network interface 804 may transmit digital content of an interface generated through the Internet to an execution terminal 110. In this case, the execution terminal 120 may display the received digital content and display objects of the displayed digital content.

The storage 805 may non-temporarily store data received from an external device. The storage 805 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The storage 805 may store one or more programs 806 for performing methods according to embodiments. In FIG. 3, digital content authoring software is illustrated as an example of the programs 806. The storage 805 may receive inputs and various setting details required for digital content authoring from the execution terminal 120 or the user of the authoring terminal 110 and store the received information.

Although the configuration and operation of the authoring terminal 110 have been mainly described above, the above embodiment may apply the same to the execution terminal 120 if the execution terminal 120 performs a digital content authoring method according to an embodiment. That is, in the description of the authoring terminal 110, embodiments related to the execution of digital content may apply the same to the execution terminal 120. In addition, the execution terminal 120 may include each element of the authoring terminal 110.

The methods according to the embodiments described above can be performed by the execution of a computer program implemented as computer-readable code. The computer program may be transmitted from a first computing device to a second computing device through a network such as the Internet and may be installed in the second computing device and thus used in the second computing device. Examples of the first computing device and the second computing device include fixed computing devices such as servers, physical servers belonging to server pools for cloud services, and desktop PCs.

The computer program may be stored in a recording medium such as a DVD-ROM or a flash memory.

The concepts of the invention described can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A screen mode switching method performed by a digital content authoring terminal which displays a digital content authoring interface, wherein the digital content authoring interface comprises a work area displaying digital content being authored, and the method comprises:
    switching a mode of the work area to an edit mode without an input for switching the mode of the work area to the edit mode in response to a user input made to select a first user interface (UI) object for executing a first function, not made to switch the mode of the work area to the edit mode; and
    switching the mode of the work area to an execution mode without an input for switching the mode of the work area to the execution mode in response to a user input made to select a second UI object for executing a second function different from the first function, not made to switch the mode of the work area to the execution,
    wherein the edit mode is a mode for editing an object constituting the digital content, and the execution mode is a mode for simulating the digital content.

2. The method of claim 1, wherein the work area comprises a simulation area that must be secured to simulate the digital content, and the switching of the mode of the work area to the execution mode comprises displaying a frame surrounding the simulation area.

3. The method of claim 1, wherein the work area comprises a simulation area that must be secured to simulate the digital content, and the switching of the mode of the work area to the execution mode comprises, when only a part of the simulation is displayed in the work area, changing a viewpoint such that the entire simulation area is displayed in the work area.

4. The method of claim 1, wherein the work area comprises a simulation area that must be secured to simulate the digital content, and the switching of the mode of the work area to the execution mode comprises, when the object is located outside the simulation area, displaying only an object located inside the simulation area.

5. The method of claim 1, wherein the work area comprises a simulation area that must be secured to simulate the digital content, and the switching of the mode of the work area to the execution mode comprises changing a shape of a pointer to a shape different from the shape of the pointer when the work area is in the edit mode as the pointer enters the simulation area after the mode of the work area is switched to the execution mode.

6. The method of claim 1, wherein the first function is a function for adding the object to the digital content or editing the object included in the digital content.

7. The method of claim 1, wherein the second function is a function for defining a dynamic change of the object.

8. The method of claim 7, wherein the digital content authoring interface is an interface of a prototyping tool, and the second function is a function for defining a trigger for the object or defining a response of the object to the trigger.

9. A screen mode switching method performed by a digital content authoring terminal which displays a digital content authoring interface, wherein the digital content authoring interface comprises a work area displaying digital content being authored, and the method comprises:
    displaying a simulation area, which must be secured to simulate the digital content, in the work area in an execution mode for simulating the digital content; and
    switching a mode of the work area to an edit mode without an input for switching the mode of the work area in response to a user input to an area outside the simulation area,
    wherein the edit mode is a mode for editing an object constituting the digital content.

10. The method of claim 9, wherein the displaying of the simulation area, which must be secured to simulate the digital content, in the work area in the execution mode for simulating the digital content comprises displaying an interface of a digital content authoring tool outside the simulation area as being in a disabled state.

11. A screen mode switching method performed by a digital content authoring terminal which displays a digital content authoring interface, wherein the digital content authoring interface comprises a work area displaying digital content being authored, and the method comprises:
    displaying a work area between a first area and a second area;
    switching a mode of the work area to an edit mode when a pointer enters the first area without an input for switching the mode of the work area; and
    switching the mode of the work area to an execution mode when the pointer enters the second area without an input for switching the mode of the work area.

12. The method of claim 11, wherein the switching of the mode of the work area to the edit mode comprises switching the mode of the work area to the edit mode only when the pointer stays in the first area for a predetermined time or longer, and the switching of the mode of the work area to the execution mode comprises switching the mode of the work area to the execution mode only when the pointer stays in the second area for a predetermined time or longer.

* * * * *